Aug. 16, 1960
R. J. DAVIES ET AL
2,949,316
ISOLATOR VALVE FOR FLUID-PRESSURE SYSTEM
Filed May 16, 1958
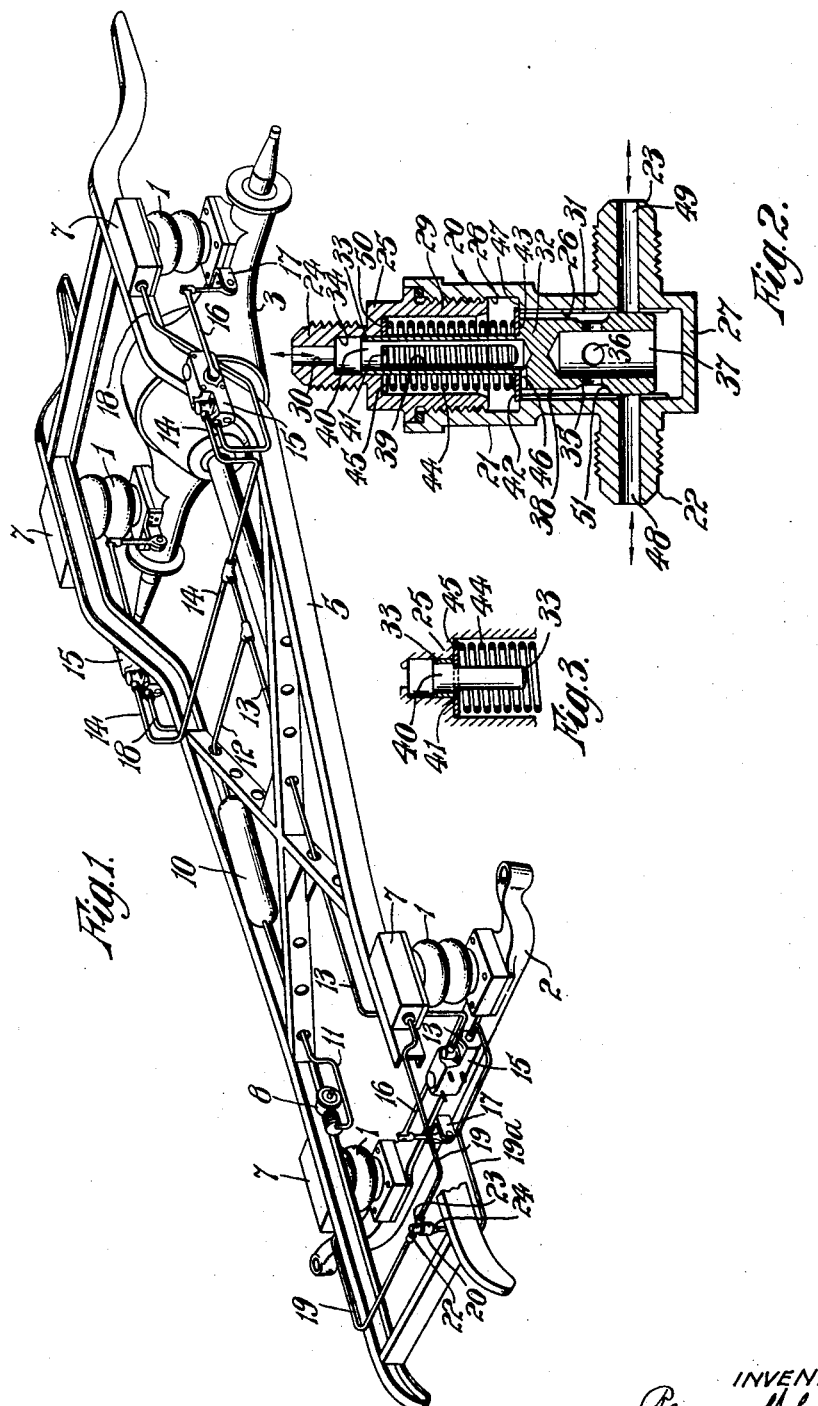
INVENTOR
Raymond John Davies
by Benj. T. Rauber
his attorney

United States Patent Office 2,949,316
Patented Aug. 16, 1960

2,949,316

ISOLATOR VALVE FOR FLUID-PRESSURE SYSTEM

Raymond John Davies, Coundon, Coventry, and Bernard Fernand Didier Pacaud, Earlsdon, Coventry, England, assignors to Dunlop Rubber Company Limited, London, England, a British company Filed May 16, 1958, Ser. No. 735,733

Claims priority, application Great Britain May 29, 1957

8 Claims. (Cl. 280—124)

This invention relates to an isolator valve for a fluid-pressure system and more particularly to an isolator valve for use in the fluid-pressure conduits of a vehicle fluid suspension system. It also relates to fluid-pressure systems incorporating such an isolator valve.

In fluid suspension systems for vehicles, an automatic levelling valve is normally used for maintaining the body of the vehicle at a constant height from the ground, despite variations in the load carried, and this valve may conveniently be one of the kind disclosed in the specifications of either of co-pending applications Ser. No. 691,-565, filed October 22, 1957, or Ser. No. 691,656, filed October 22, 1957. These applications have a common assignee with the present application. One such levelling valve is normally associated with each rear fluid spring, and a further similar levelling valve is associated in parallel with both the front springs of the vehicle, although systems are also known wherein a separate levelling valve is associated with each of the fluid springs, both front and rear.

It is highly desirable, from the aspect of economy and general simplicity of the installation, that a single levelling valve should be associated in parallel with both springs on each axle, but one great disadvantage of so doing is that as both springs are thus connected to a common conduit between themselves and the levelling valve and are thus in free fluid communication with each other, a heavy impact on, for instance, the near-side spring causes a surge of fluid into the off-side spring and any rolling tendency of the vehicle due to the impact on the near side is accentuated by a volumetric increase in the off-side spring and an uncontrollable or uncomfortable roll may develop. This tendency is resisted, in cases where each rear spring has its individual levelling valve and the front springs are connected in parallel, by the individual operation of the rear springs, but the comparative freedom to roll at the front axle may produce a tendency to twisting of the chassis members or body frame which, particularly in vehicles of unitary body/chassis construction, is highly undesirable.

It is an object of the present invention to provide an isolator valve for installation between opposite parallelly-coupled fluid springs of a vehicle, whereby the near-side and off-side springs are normally substantially isolated from each other but are adapted to be placed in free communication with each other and with a levelling valve during periods when said levelling valve is in operation.

A further object of the invention is to provide a vehicle fluid suspension system in which such an isolator valve is incorporated.

According to the invention, therefore, an isolator valve comprises a housing having a pressure-fluid inlet passage and a plurality of pressure-fluid outlet passages therein and means adapted normally to permit only a restricted interflow of pressure-fluid between said outlet passages and between said outlet passages and said inlet passage, in either direction, said means being adapted to respond to a pressure differential between said inlet passage and any one or more of said outlet passages to permit the free flow of pressure-fluid therebetween, in either direction, and simultaneously to permit the free interflow of pressure-fluid between said outlet passages.

Also according to the invention, an isolator valve for a vehicle fluid suspension system comprises a housing having at one end a pressure-fluid inlet passage and adjacent the other end a plurality of pressure-fluid outlet passages, means slidable in said housing and adapted normally to be held in a central position by a spring acting in opposite directions thereupon and to provide a restricted flow of pressure-fluid between said inlet and outlet passages and between said outlet passages, in either direction, said means being adapted to slide in said housing against said spring in response to a fluid-pressure differential between said inlet passage and any one or more of said outlet passages to permit the free interflow of pressure-fluid between said outlet-passages and the free flow of pressure-fluid between said inlet passage and any one or more of said outlet passages or vice versa.

Further, according to the invention, a vehicle suspension system comprises a pair of fluid springs, one on each side of said vehicle, a levelling valve connected to a source of fluid-pressure and operable to vary the volume of pressure-fluid in said springs in accordance with vertical movement of said vehicle, and an isolator valve in fluid communication with said levelling valve and with said fluid springs, said isolator valve normally restricting the flow of pressure-fluid between said fluid springs and being adapted, upon operation of said levelling valve, to place said levelling valve and each said fluid spring in mutual fluid communication one with the other.

But a better understanding of the invention may be obtained from the following description when this is read with reference to the accompanying drawings, of which:

Figure 1 is a perspective view of a vehicle chassis and pneumatic suspension system incorporating an isolator valve according to the invention, Figure 2 is a vertical section through such an isolator valve, and Figure 3 is a section of a portion of Figure 2 taken in a vertical plane at an angle of 90° to Figure 2.

As shown in Figure 1 of the drawings, the vehicle suspension system comprises a variable-volume pneumatic bellows 1 secured to, and extending upwardly from, each end of the front axle 2 and the rear axle housing 3 of the vehicle adjacent each of the four wheels thereof and providing four flexible supports for the chassis 5 of the vehicle. The chassis 5 is thus supported by the pneumatic bellows 1 in such a manner that road shocks on the wheels will be cushioned by variations in the volumetric capacity of the pneumatic bellows 1 which thus act as air springs and will be referred to as such hereunder. Panhard and torque rods will normally be located between the front and rear axles and appropriate positions on the chassis, in the known manner, but as these form no part of the present invention they are omitted from Figure 1 for the sake of clarity.

The air springs 1 may take any one of a number of known forms, and such springs may comprise a single bellows member or a plurality of superimposed bellows members, all as well-known in the art. Where it is necessary or desirable to reduce the vertical separation between the chassis 5 and the respective axles 2 and 3, in order to limit the clearance of the chassis from the ground and so to lower the centre of gravity of the vehicle, the number of superimposed bellows members which would normally be required for a given size of vehicle may be reduced and the springs 1 may each comprise a single bellows member, or two superimposed bellows members, secured between rigid plates and being in pneumatic communication with an extra volume tank 7 associated with each air spring 1 but secured at some convenient place on the vehicle chassis which may, if desired, be remote from the associated air spring 1. Thus when an air spring 1 is compressed by a road shock, air therein is displaced into the extra volume tank 7, which is normally under the same value of compression as the spring 1 with which it is associated.

The pneumatic pressure for pressurising the springs 1 is provided by a compressor 8 operated by the engine (omitted from Figure 1 for the sake of clarity) of the vehicle to pressurise a pneumatic reservoir 10 through a conduit 11. A further conduit 12 from the reservoir 10 conveys compressed air through branch conduits 13 and 14 from the reservoir 10 to the inlets of levelling valve mechanisms 15, one of which is associated with each air spring 1 on the rear axle 3 and one of which is associated in parallel with both air springs 1 on the front axle 2.

The levelling valve mechanisms 15 operate as is described in said co-pending applications Ser. No. 691,565 and 691,656. Briefly, their function is to maintain the chassis 5 and axles 2 and 3 separated by a predetermined vertical distance regardless of variations in the loading of the vehicle. This is done by means of a rocking lever 16 pivoted in the housing of each mechanism 15 and pivotally connected with a bracket 17 or the like secured to an axle 2 or 3. The housing of each mechanism 15 is secured to the chassis 5 or the like so that any variation in the distance separating the axle 2 or 3 from the chassis 5 is adapted to rock the lever 15 one way or the other so that mechanism (not shown) associated with the rocking lever 16 will open either an inlet valve or an exhaust valve to admit or release compressed air to, or from, the associated spring 1, depending upon whether the vertical separation is too great or too small. The outlet of each levelling valve mechanism 15 is connected by conduits 18, 19 with the associated extra volume tank 7, the conduit 19 associated with the front axle springs being connected to both the near and off-side air springs 1. Normally each levelling valve mechanism 15 is provided with a time-interval device whereby a lag of some seven seconds durations is provided between movement of the rocking lever 16 and actuation of the associated inlet or outlet valves so that road impact shocks or the roll associated with cornering of the vehicle will not operate the valve mechanism 15.

This prevents the rear portion of the chassis 5 from rolling or swaying, but where the levelling valve mechanism 15 associated with the front axle 2 is common to both front air springs 1, there has hitherto been a free interchange of air through the conduit 19 between the opposed air springs 1 so that as, say, the near-side spring 1 was depressed, air therefrom was forced to the off-side spring 1 which was accordingly expanded in such a manner as to tend to accentuate the roll or sway. Such a tendency, whilst being dangerous, was also very undesirable as tending to twist or distort the frame or chassis 5.

According to the invention, this interchange between the opposed springs 1 is prevented by an isolator valve 20 interposed in the conduit 19 between the opposite air springs 1, i.e., between the respective extra volume tanks 7 and the associated levelling valve mechanism 15.

The isolator valve 20 (Figure 2) comprises a cylindrical housing 21 having diametrically-opposed pneumatic connections 22, 23 extending radially adjacent one end thereof and a further pneumatic connection 24 formed integrally and co-axially with a closure member 25 secured in the end of the housing 21 remote from the connections 22 and 23, which latter are adapted to be connected into the conduit 19 between the opposite front axle springs 1. The connection 24 is adapted to be connected into the conduit 19a between the outlet of the front levelling valve mechanism 15 and the conduit 19.

The housing 21 is bored throughout the greater portion of its length with an axial bore of two diameters, the smaller diameter bore 26 being axially bounded by an integral radial wall 27 forming a closure for the end of the housing 21 adjacent the connections 22, 23. The larger diameter bore 28 is adapted to be closed by the tubular closure member 25 which has an annular skirt 29 extending deeply into the larger bore 28 and has a three-diameter axial passage extending therethrough. The smaller diameter passage 30 in the closure member comprises the screwed connection 24 which is adapted to be secure to the pneumatic conduit 19a.

The inner periphery of the smaller diameter bore 26 of the housing 21 is formed with a plurality of shallow, narrow, axial grooves 31 and a piston 32, having a tubular extension 33 of a diameter enabling it to slide in the intermediate bore 34 of the tubular closure member 24, is freely slidable in said smallest bore 26 of the housing 21, the axial grooves 31 permitting a slow bleeding of pneumatic pressure around and along said piston 32 whereby, during periods of inoperation, the pneumatic pressure on all sides of the piston 32 may be kept in equilibrium. The axial grooves 31 may be replaced by a narrow, shallow, annular groove (not shown) around the periphery of the piston 32 in such a position that it connects the pneumatic passages through the connections 22 and 23 when the piston 32 is in its central position.

The piston 32 comprises a cylindrical portion of two different diameters joined by an annular recess 35 formed in its periphery substantially medially of its length, and passages 36 extend through the piston 32 from the base of the recess 35. These passages 36 communicate with a blind hole 37 bored into the base of the piston 32 and extending deeply thereinto. An annular space 38 surrounds the smaller diameter portion of the piston 32. Alternatively, the piston 32 may be of a single diameter within the bore 26 and the space 38 may be defined by diametrically-opposed flats formed in the periphery of the piston 32. The tubular member 33 has two diametrically-opposite axial slots 39 of substantial width cut through its periphery, the circumferential extent of each slot 39 being substantially one-quarter of the circumference of the tubular member 33. These slots 39 terminate slightly axially-inwardly of the free end of the tubular member 33, leaving an annular ring 40 the axially-inner radial edges of which, at the slots 39, define a pair of diametrically-opposed abutments 41.

An annular disc washer 42 is placed on the tubular member 33 so that it rests upon the step 43 formed by the junction of the tubular member 33 with the piston 32. A helical compression spring 44 of predetermined rating is then located co-axially on the tubular member 33 and is held thereon under a predetermined degree of pre-loading, by a C washer 45 (i.e., an annular washer having a parallel-sided slot formed therein) which is inserted radially across the truncated peripheral faces of the tubular member 33 defined by the slots 39 and is pressed against the abutment 41 at the annular ring 40 on the tubular member 33 by the spring 44 (see Figures 2 and 3). A radial passage 46 is formed in the step 43 and leads from the base of the interior of the tubular member 33 to the annular space 38 around the adjacent end of the piston 32.

The piston 32 is inserted in the small diameter bore 26 of the housing 21 so that the washer 42 beneath the spring 44 abuts the annular step 47 formed by the junction of the two different diameter portions 26, 28 of the bore of the housing 21. In this position the piston 32 is held by the spring 44 in the bore 26 of the housing with its lower cylindrical portion substantially occluding the passages 48, 49 to the near-side and off-side air springs and with the C washer 45 abutting the step 50 formed by the junction of the large and intermediate diameter bores of the tubular closure member 24. The spring 44 is held under a predetermined degree of compression between the washers 42 and 45 and their associated steps and abutments. The annular ring 40 at the end of the tubular member 33 is located in the intermediate bore 34 of the tubular closure member 24 with room for axial movement therein.

It will be apparent from the above that the piston 32 is normally held in a central, or balanced, position, by the opposing abutment of the annular washer 42 on the step 47 in the housing 21 in one direction and the abutment of the C washer 45 with the step 41 in the tubular member 33 and the step 50 in the closure member 25 in the other direction, so that movement of the piston 26 is spring-opposed in either direction.

In the operation of the device the opening of the inlet valve in the associated levelling valve mechanism 15 will cause pneumatic pressure to flow through the conduit 19a into the passages 30 and 34 in the tubular closure member 25, into the tubular member 33 and through the slots 39 therein into the surrounding pressure chamber 28 and will press against the adjacent head of the piston 32 at the base of the tubular member 33 and passage 46 and against the annular step 51 joining the recess 35 with the wider portion of the piston, to force the piston 32 against the spring 44 until it abuts the closed end 27 of the housing 21 and moves the annular recess 35 opposite the passages 48, 49 to the near- and off-side air springs 1. When these passages 48, 49 are opened to the passages 36 and recess 35, pneumatic pressure flows through the passages 48, 49 and conduit 19 to the opposite springs 1. At this stage the opposite springs 1 are in pneumatic communication with each other through the recess 35 in the piston and any pressure differential between them is automatically corrected.

As the volume of the air springs 1 increases, the body of the vehicle rises, as described in the aforementioned applications Serial Nos. 691,656 and 691,565 and the inlet valve in the levelling valve mechanism 15 closes. The pneumatic pressure in the air springs 1 and levelling valve conduits 19, 19a is equal, and as pneumatic pressure passing through the recess 35 has also passed into the holes 36 in the piston 32 and the central bore 37 in its base, the pressure on all sides of the piston 32 is equal, and, when the levelling inlet valve closes, the piston 32 is drawn to its central position by the spring 44, the wider cylindrical base portion of the piston 32 closing the passages 48, 49 to the air springs 1 except for a small leakage through the grooves 26 in the housing 21, or through the alternative peripheral recess on the piston, and past the piston. This leakage is sufficient to maintain an equal pressure on all sides of the piston 32 but is insufficient to permit any effective transfer of pressure between the opposite air springs 1 if one spring should be subjected to a heavy impact.

If load is reduced in the vehicle and the body rises sufficiently to open the exhaust valve in the levelling valve mechanism 15, pressure in the conduit 19a between the isolator valve 20 and the levelling valve mechanism is reduced and the greater pressure acting against the base of the recess 37 and against the base of the piston 32 is sufficient to raise the piston 32 against the spring 44, the tubular member 33 sliding in the intermediate bore 34 of the tubular closure member 25. The base of the piston 32 is forced clear of the passages 48, 49 to the air springs 1, and pressure therefrom escapes through the recess 37 in the base of the piston, the holes 36 and circumferential recess 35, through the annular space 38 between the piston and the bore 26, the recess 46 and thence through the tubular member 33 to the exhaust of the levelling valve mechanism 15. As the pressure escapes from the air springs 1, the levelling valve mechanism exhaust valve closes and an equal pressure returns around the piston 32, which is again moved to its central position by the spring 44.

From the above description it will be clear that means have been provided to prevent the transfer of pressure surges between parallelly-connected springs on opposite sides of a vehicle without affecting the efficiency of a levelling valve mechanism operable simultaneously upon said air springs.

The term "air" or "pneumatic" as used herein are intended to be read as referring equally to any gaseous fluents suitable for the present purpose, and to include any suitable inert gases such as, for example, nitrogen. Furthermore, although the specific form of the invention has been described hereabove as comprising a pneumatic system it is equally applicable to hydraulic suspension systems and also to oleo-pneumatic systems wherein the fluid springs each comprises a gas compression chamber and an intimately-associated liquid displacement chamber. In such an oleo-pneumatic system the levelling valve and isolator valve would both operate under hydraulic pressures.

Having now described our invention, what we claim is:

1. An isolator valve for a vehicle suspension system comprising a housing having at one end a pressure-fluid inlet passage and adjacent the other end a plurality of pressure-fluid outlet passages, means slidable in said housing and adapted normally to be held in a central position by a spring acting in opposite directions thereupon and to provide a restricted flow of pressure-fluid between said inlet and outlet passages and between said outlet passages, in either direction, said means being adapted to slide in said housing against said spring in response to a fluid-pressure differential between said inlet passage and any one or more of said outlet passages to permit the free interflow of pressure-fluid between said outlet passages and the free flow of pressure-fluid between said inlet passage and any one or more of said outlet passages or vice versa.

2. An isolator valve according to claim 1 comprising two said pressure-fluid outlet passages adapted to be connected, respectively, to a near-side and an off-side fluid spring of a vehicle, said inlet passage being adapted to be connected to a source of fluid-pressure on said vehicle and said means being adapted normally to restrict the flow of pressure-fluid between said near-side and said off-side spring to restrict the rolling of said vehicle about the longitudinal axis thereof.

3. An isolator valve according to claim 1, wherein said means comprises a piston slidable in a chamber in said housing and comprising a portion adapted normally to be held in flow-restricting association with adjacent ends of said outlet passages, and a restricted passage or passages between opposite ends of said piston whereby to provide a restricted interflow of pressure-fluid between said inlet and outlet passages to balance the fluid-pressure therein.

4. An isolator valve according to claim 3 wherein said piston comprises a tubular extension slidably associated with said inlet passage, said spring being located in said chamber and having one end engaging abutments on said cylinder and in said chamber and having the other end engaging an abutment on said tubular extension.

5. An isolator valve according to claim 4, wherein said piston comprises a portion of reduced diameter on the end thereof towards said tubular extension and said tubular extension comprises a passage for pressure-fluid between said inlet passage and an annular fluid space between said chamber and said piston defined by the reduced diameter portion of said piston.

6. An isolator valve according to claim 5 comprising a peripheral annular recess formed in said piston at the end of said reduced diameter portion thereof remote from said tubular extension, a plurality of passages formed diametrically through said piston from the base of said recess, and a further recess formed co-axially in the base of said piston remote from said tubular member and communicating with said diametrical passages in said annular recess.

7. An isolator valve according to claim 6 wherein an increase in the fluid-pressure in said inlet passage is adapted to move said piston against said spring means to bring said annular recess into association with said outlet passages to provide a free passage for the flow of pressure-fluid from said inlet passage to said outlet passages and between said outlet passages, said spring means being adapted to return said piston to its central position when the pressure in said inlet and outlet passages is substantially equal.

8. An isolator valve according to claim 6 wherein a decrease in the fluid-pressure in said inlet passage is adapted to cause the pressure in the co-axial recess at the base thereof to move said piston against said spring means until the base of said piston is moved clear of said outlet passages, whereby the excess pressure in one or both of said outlet passages is adapted to flow to said inlet passage through said co-axial recess and said diametrical passages in said piston until said balance is regained.

References Cited in the file of this patent

UNITED STATES PATENTS

| | | |
|---|---|---|
| 2,388,755 | McLeod | Nov. 13, 1945 |
| 2,848,249 | Bertsch | Aug. 19, 1958 |